(12) United States Patent
Suzuki (10) Patent No.: US 11,449,695 B2
(45) Date of Patent: Sep. 20, 2022

(54) READING SYSTEM AND CAMERA

(71) Applicant: Asterisk, Inc., Osaka (JP)

(72) Inventor: Noriyuki Suzuki, Osaka (JP)

(73) Assignee: ASTERISK, INC., Osaka (JP)

( * ) Notice: Subject to any disclaimer, the term of this patent is extended or adjusted under 35 U.S.C. 154(b) by 0 days.

(21) Appl. No.: 16/617,925

(22) PCT Filed: Jun. 29, 2018

(86) PCT No.: PCT/JP2018/024800
§ 371 (c)(1),
(2) Date: Nov. 27, 2019

(87) PCT Pub. No.: WO2019/009197
PCT Pub. Date: Jan. 10, 2019

(65) Prior Publication Data
US 2021/0142014 A1    May 13, 2021

(30) Foreign Application Priority Data

Jul. 3, 2017  (WO) .................. PCT/JP2017/024411
Nov. 17, 2017  (JP) .............................. JP2017-222233

(51) Int. Cl.
*G06K 7/10*  (2006.01)
*G06K 7/14*  (2006.01)

(52) U.S. Cl.
CPC ....... *G06K 7/10722* (2013.01); *G06K 7/1413* (2013.01)

(58) Field of Classification Search
CPC ..... G06K 7/10772; G06K 7/14; G06K 7/1478
USPC ..... 235/462.41, 462.24, 462.01, 462.11, 375
See application file for complete search history.

(56) References Cited

U.S. PATENT DOCUMENTS

| | | | |
|---|---|---|---|
| 2002/0017567 A1* | 2/2002 | Connolly | G06K 7/10653 235/472.02 |
| 2002/0030094 A1* | 3/2002 | Curry | G06K 17/00 235/375 |
| 2006/0289771 A1 | 12/2006 | White | |
| 2011/0007035 A1* | 1/2011 | Shai | G06F 3/0338 345/179 |
| 2013/0109316 A1 | 5/2013 | Lee | |
| 2014/0249944 A1* | 9/2014 | Hicks | G06Q 30/0281 705/17 |

(Continued)

FOREIGN PATENT DOCUMENTS

| | | | |
|---|---|---|---|
| CN | 205334489 U | * | 6/2016 |
| JP | 2014-096128 A | | 5/2014 |
| JP | 2016-033767 A | | 3/2016 |

OTHER PUBLICATIONS

International Search Report dated Sep. 4, 2018 in corresponding International Patent Application No. PCT/JP2018/024800, filed Jun. 29, 2018 (with English Translation).

*Primary Examiner* — Edwyn Labaze
(74) *Attorney, Agent, or Firm* — Global IP Counselors, LLP (57) ABSTRACT

A reading system includes a portable information terminal configured to recognize information in a symbol on the basis of an acquired image, and a wearable camera that functions as a peripheral device for the portable information terminal. The camera has an image sensor configured to generate the image, and is configured to transmit the generated image to the portable information terminal.

6 Claims, 5 Drawing Sheets

(56) References Cited

U.S. PATENT DOCUMENTS

| | | | | |
|---|---|---|---|---|
| 2015/0278570 | A1* | 10/2015 | Van Horn | H01Q 1/52 235/472.01 |
| 2016/0171268 | A1* | 6/2016 | Miller | G06K 7/10009 235/472.02 |
| 2020/0134275 | A1* | 4/2020 | Sakamoto | G06K 7/10722 |

* cited by examiner

READING SYSTEM AND CAMERA

CROSS-REFERENCE TO RELATED APPLICATION

This application is a U.S. National Stage application of International Application No. PCT/JP2018/024800, filed Jun. 29, 2018, which claims priority to International Application No. PCT/JP2017/024411, filed Jul. 3, 2017 and Japanese Patent Application No. 2017-222233, filed Nov. 17, 2017, the contents of each of which are hereby incorporated herein by reference.

BACKGROUND

Field of the Invention

The present invention relates to a reading system for reading information from a symbol on an article and to a camera.

Background Information

Conventionally, hand-held barcode readers have been used in, for example, systems for storage and shipping management of products and systems for inventory management of products. A hand-held barcode reader includes a camera and a processor configured to read information from a barcode contained in an image output from the camera by executing predetermined decoding processing with respect to the image, and the camera and the processor are housed in a single housing configured to be hand-held. A user holds the above-described barcode reader in his/her hand and performs a reading operation while holding the camera over a product.

JP 2014-96128 A describes a system that includes a mobile device and a peripheral device(s), and a barcode reader is shown as an example of the peripheral device. The barcode reader converts information it has read from a barcode into a keyboard format, and transmits the converted information to the mobile device using wireless communication device or means.

SUMMARY

In JP 2014-96128 A, the barcode reader, which is the peripheral device for the mobile device, includes not only an optical component or a sensor for reading barcodes but also a processor for decoding. Although the barcode reader (reading device) is intended to be used with the mobile device having a CPU, the barcode reader also includes a processor. This causes an increase in the cost of the system as a whole.

In light of the above-described problem, it is an object of the present invention to provide a reading system and a camera that can save costs.

In order to achieve the above object, embodiments of the present invention include a camera that functions as a peripheral device for a portable information terminal configured to recognize information in a symbol on the basis of an acquired image, has an image sensor configured to generate the image, and is configured to transmit the generated image to the portable information terminal.

The camera of the present invention can include a light source configured to display a marker in a region to be imaged by the image sensor.

The camera of the present invention can include: an imager with the image sensor disposed therein; and a release that is separate from the imager and is configured to input to the imager a trigger signal for generating the image, and the imager and the release can be worn on different fingers.

In embodiments of the camera of the present invention, the release can have a switch for generating the trigger signal, and the switch can be disposed at a position where the switch is operable with a thumb.

The release can include: a first release having a first electrode and to be worn on a thumb; and a second release having a second electrode and to be worn on a part of a hand different from the part on which the first release is to be worn, and the trigger signal can be generated when the first electrode and the second electrode are brought into contact with each other.

The camera of the present invention can include a wireless communicator configured to transmit the image to the portable information terminal.

The present invention also provides a reading system including: a portable information terminal configured to recognize information in a symbol on the basis of an acquired image; and a camera that functions as a peripheral device for the portable information terminal, has an image sensor configured to generate the image, and is configured to transmit the generated image to the portable information terminal.

The present invention includes a camera that is used as a peripheral device for a portable information terminal capable of recognizing information in a symbol from an acquired image and is configured to transmit the image to the portable information terminal, and the camera and the portable information terminal work together to recognize the information in the symbol. As described above, according to the present invention, image analysis is performed on the portable information terminal side, and thus, a processor for image analysis can be omitted on the camera side. Accordingly, the cost required for the camera and the system as a whole can be reduced.

BRIEF DESCRIPTION OF DRAWINGS

The invention will be explained in more detail hereinafter with reference to the drawings.

DETAILED DESCRIPTION OF THE EMBODIMENTS

An embodiment of the reading system according to the present invention will be described below with reference to the drawings.

Figure 1:
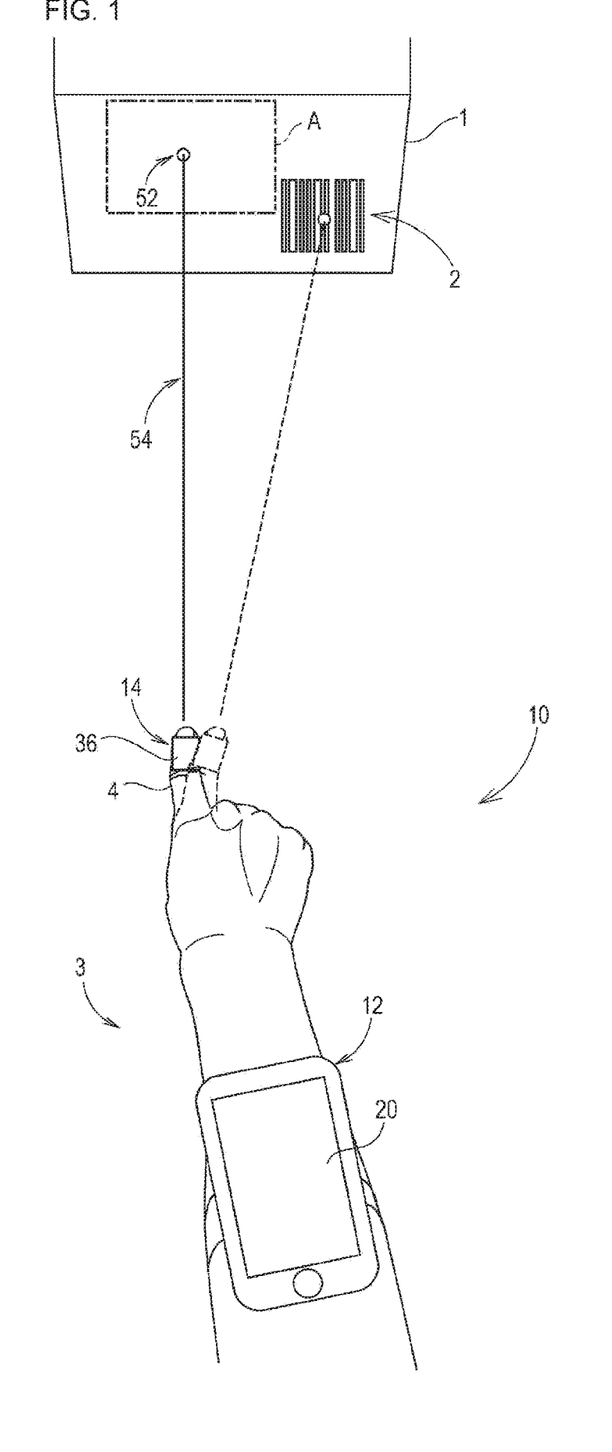
FIG. 1 illustrates a user wearing a reading system according to an embodiment of the present invention.

As shown in FIG. 1, a reading system 10 according to the present embodiment is a system configured to read information from a barcode 2 on an article 1 and to provide various services on the basis of the information it has read.

The reading system 10 can be worn on an upper limb 3 of a user who performs a reading operation. The reading system 10 includes a portable information terminal 12 and a wearable camera 14.

Figure 2A:
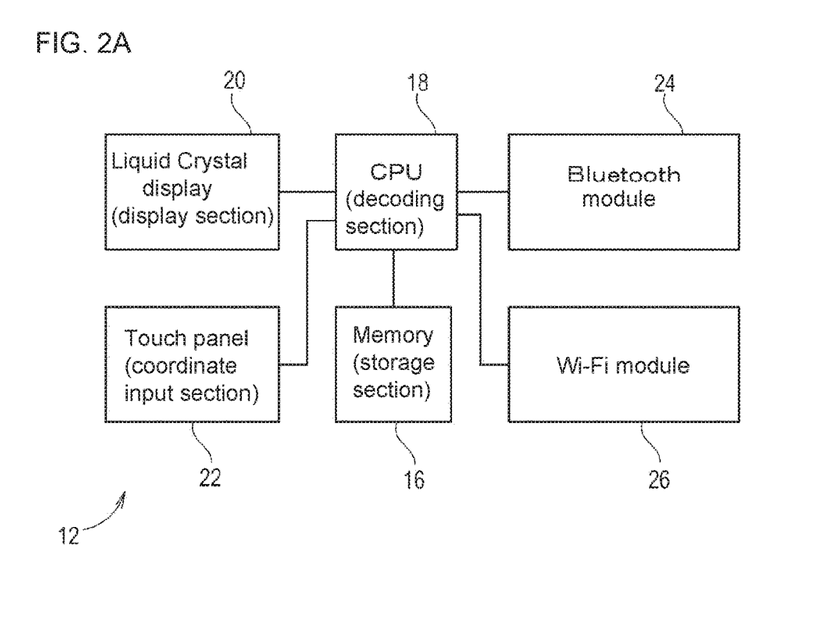
FIG. 2A is a block diagram illustrating a portable information terminal included in the reading system.
Figure 2B:
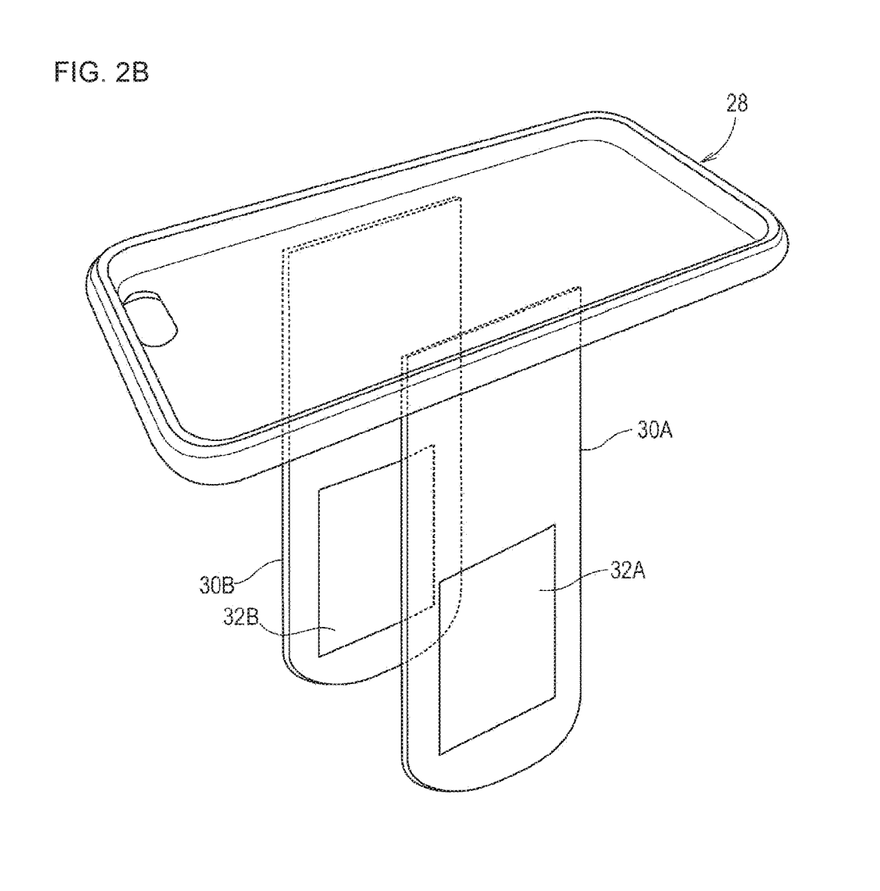
FIG. 2B is a perspective view of a case of the portable information terminal.

The portable information terminal 12 is a known smart device exemplified by a smart phone or a tablet. As shown in FIGS. 2A and 2B, the portable information terminal 12 includes a memory 16 that functions as a storage section in which basic software is stored and a CPU 18 configured to execute the basic software. The portable information terminal 12 also includes a liquid crystal display 20 that functions as a display section configured to display information and is controlled by the CPU 18 configured to execute the basic software, a touch panel 22 that functions as a coordinate acquisition section configured to acquire coordinates input by the user, a Bluetooth (registered trademark) module 24 that functions as a wireless communication section (wireless communicator) configured to perform wireless communication with the wearable camera 14, and a Wi-Fi module 26 that functions as a network communication section (wireless communicator) configured to perform wireless communication via the Internet. A program for reading information from the barcode 2 by acquiring an image and performing decoding processing with respect to the acquired image is pre-stored on the memory 16, and the CPU 18 functions as a decoding section configured to perform the decoding processing with respect to the image.

The portable information terminal 12 with such a configuration is housed in a case 28 that enables the liquid crystal display 20 to be exposed. A pair of belts 30A and 30B that extend parallel to each other are attached to a rear surface of the case 28. The pair of belts 30A and 30B are wound around an arm of the user and fastened to each other with hook-and-loop fastener strips 32A and 32B provided in leading end portions of the pair of belts 30A and 30B, respectively.

Figure 3A:
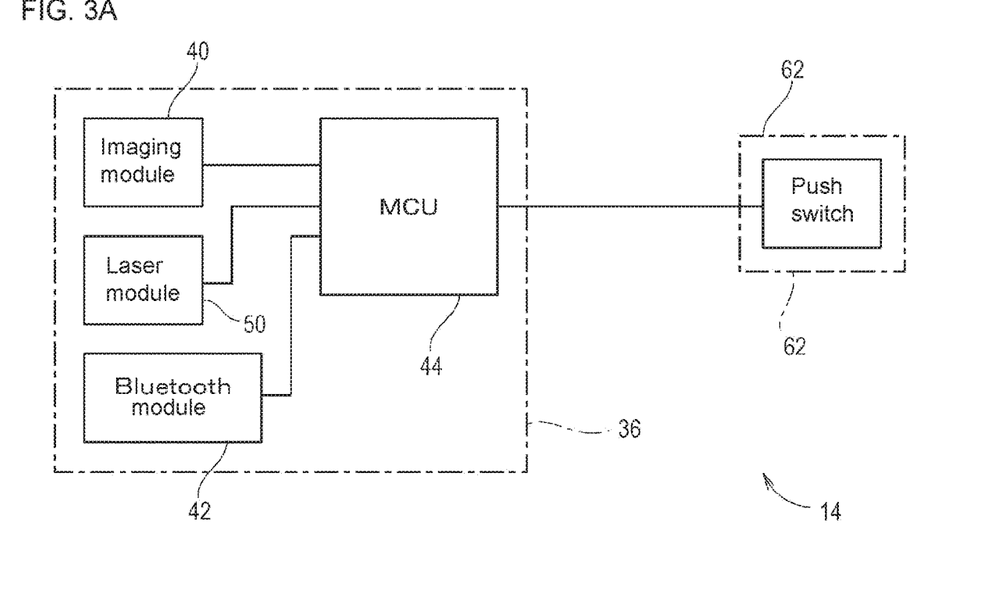
FIG. 3A is a block diagram illustrating a wearable camera included in the reading system.
Figure 3B:
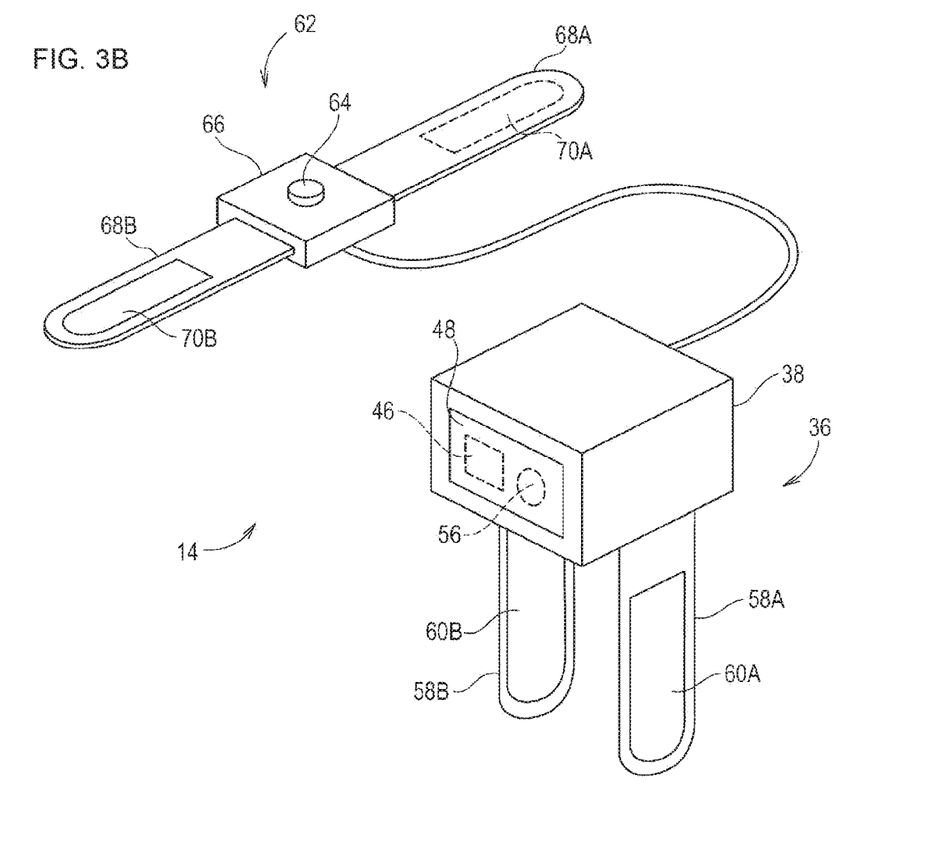
FIG. 3B is a perspective view of the wearable camera.

Referring back to FIG. 1, the wearable camera 14 can be worn on a hand of the user. The wearable camera 14 captures an image of the article 1 to be subjected to a reading operation and transmits the-generated image to the portable information terminal 12. The wearable camera 14 has an imaging unit (imager) 36 to be worn on a forefinger (index finger) 4. As shown in FIGS. 3A and 3B, in the imaging unit 36, electronic components such as an imaging module 40, a Bluetooth module 42, and an MCU 44 are incorporated in housing 38. These electronic components are operated by power supplied from a battery (not shown) housed in the housing 38.

The imaging module 40 includes an image sensor 46 configured to output an electrical signal corresponding to the intensity of light forming an image on a light-receiving surface, and a lens (not shown) disposed in front of the light receiving surface. The imaging module 40 is disposed on the back of a window 48 on a front face of the housing 38. Accordingly, light incident on the window 48 of the housing 38 forms an image on the light-receiving surface via the lens.

The above-described imaging module 40 is controlled by the MCU 44. The MCU 44 generates an image on the basis of the electrical signal input from the imaging module 40 (image sensor 46). Also, the MCU 44 transmits the generated image to the portable information terminal 12 by controlling the Bluetooth module 42.

In the present embodiment, a laser module 50 is disposed in the housing 38 of the imaging unit 36. The laser module 50 is a module configured to display a marker 52 (FIG. 1) in an image capture region A (a region to be imaged by the image sensor 46) of the imaging module 40. Typically, the laser module 50 includes a semiconductor laser 56 configured to emit a laser beam 54 parallel to the optical axis of the lens and a drive circuit (not shown) configured to drive the semiconductor laser 56 on the basis of a control signal input from the MCU 44. The laser module 50 is disposed in the vicinity of the imaging module 40 on the back of the window 48 of the housing 38.

Figure 4:
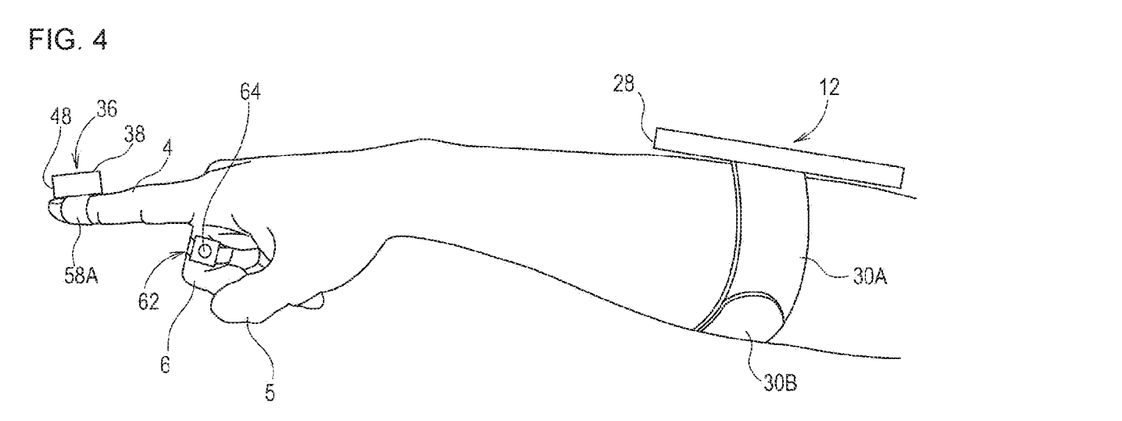
FIG. 4 illustrates how the reading system is worn.

As shown in FIG. 4, the imaging unit 36 with such a configuration is disposed on the fingertip of the user's forefinger 4 with the window 48 of the housing 38 facing toward the fingertip side. As shown in FIGS. 3A and 3B, a pair of belts 58A and 58B, which act as a fastener, are attached to a lower surface of the housing 38. The pair of belts 58A and 58B are wound around the forefinger 4 and fastened to each other with hook-and-loop fastener strips 60A and 60B disposed in leading end portions of the pair of belts 58A and 58B, respectively. The pair of belts 58A and 58B can be attached to side surfaces of the housing 38, respectively.

The wearable camera 14 of the present embodiment includes a release unit (release) 62 to be hard-wired to the imaging unit 36. The release unit 62 is a unit configured to output a trigger signal that indicates the timing to start imaging to the imaging unit 36 and in which a push switch 64 for opening/closing a current path is disposed so as to protrude from the housing 38. An output of the push switch 64 is electrically connected to an input of the MCU 44 of the imaging unit 36.

As shown in FIG. 4, the release unit 62 is disposed along the middle phalanx of a middle finger 6 of the user with the push switch 64 facing toward a thumb 5 side. As shown in FIGS. 3A and 3B, a pair of belts 68A and 68B, which act as a fastener, are attached to side surfaces of the housing 66, respectively. The pair of belts 68A and 68B are wound around the middle finger 6 and fastened to each other with hook-and-loop fastener strips 70A and 70B disposed in leading end portions of the pair of belts 58A and 58B, respectively.

Figure 5:
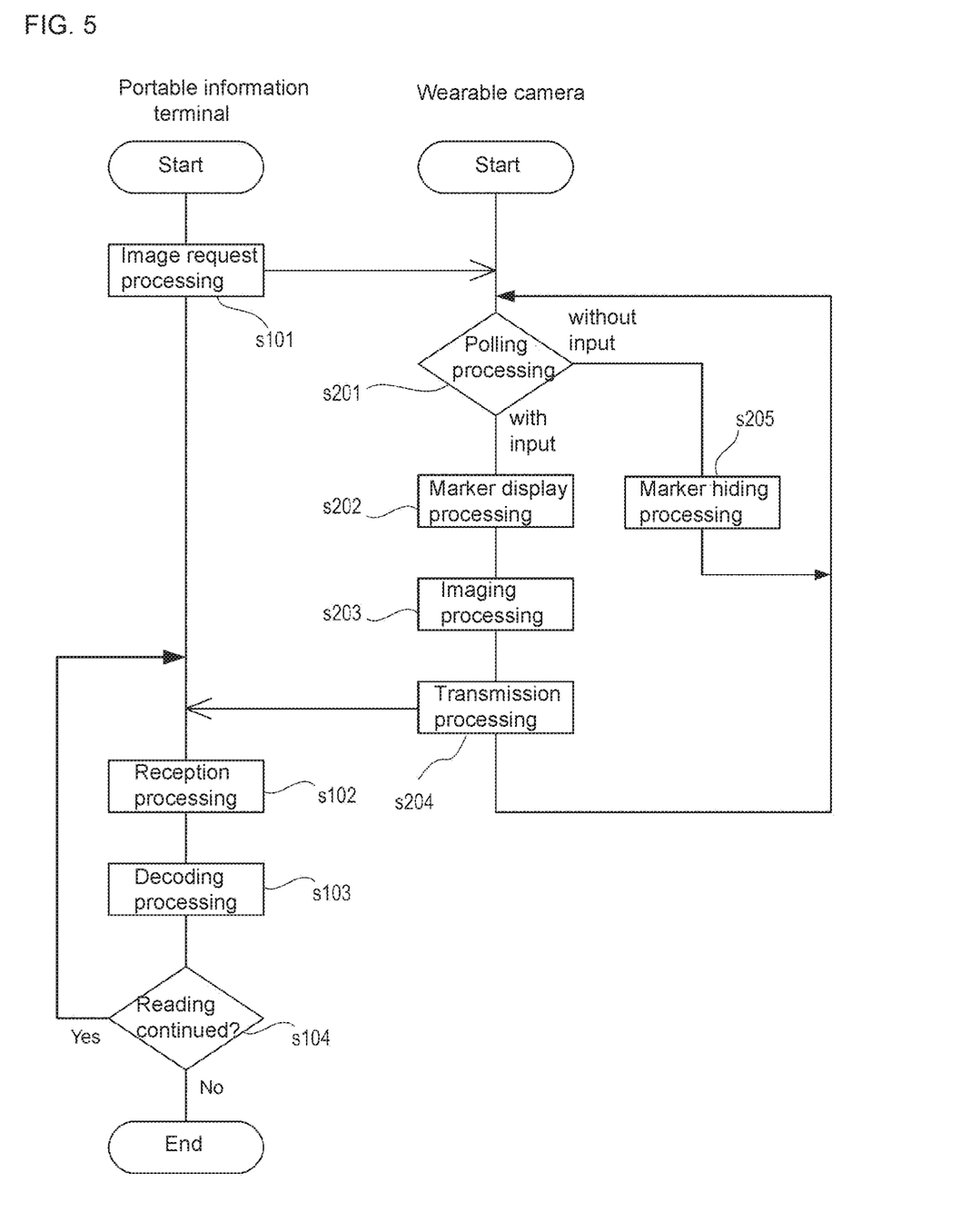
FIG. 5 is a flowchart illustrating processing in the reading system.

Processing in the portable information terminal 12 and the wearable camera 14, which constitute the above-described reading system 10, will be described with reference to FIG. 5. Processing in the portable information terminal 12 shown in FIG. 5 is started when information in the barcode 2 is necessary during a process of executing, for example, an application for article management. On the other hand, processing in the wearable camera 14 is started when power is supplied to each electronic component.

First, when processing is started in the portable information terminal 12, the portable information terminal 12 executes image request processing for making a request to transmit an image including the barcode 2 to the wearable camera 14 (s101). The CPU 18 of the portable information terminal 12 controls the Bluetooth module 24 so as to transmit this request to the wearable camera 14.

After the image request processing (s101) has been executed, the wearable camera 14 executes polling processing for periodically checking an input from the release unit 62 (s201). In the polling processing (s201), the MCU 44 of the imaging unit 36 checks whether there is an input from the push switch 64 of the release unit 62.

When there is no input, marker hiding processing for hiding the marker 52 (s205) is executed. In the marker hiding processing (s205), the MCU 44 of the imaging unit 36 controls the drive circuit (not shown) so as to stop the output from the semiconductor laser 56. After this marker hiding processing (s205) has been executed, the polling processing (s201) is executed repeatedly.

On the other hand, when there is an input, the wearable camera 14 executes marker display processing for displaying the marker 52 (s202). In this marker display processing (s202), the MCU 44 of the imaging unit 36 controls the drive circuit (not shown) so as to cause the semiconductor laser 56 to output the laser beam 54 (FIG. 1). As a result, the marker 52 (FIG. 1) is displayed in the image capture region A of the imaging module 40.

Then, the wearable camera 14 executes imaging processing for capturing an image of the article 1, which is a subject to be imaged (s203). In the imaging processing (s203), the MCU 44 of the imaging unit 36 transmits an imaging command to the imaging module 40. The imaging command is a command for converting the image of the subject (article 1) formed on the light-receiving surface of the image sensor 46 into an electrical signal. The image sensor 46 of the imaging module 40 converts the image of the article 1 into an electrical signal in response to the imaging command it has received, and then outputs the electrical signal. The MCU 44 generates an image on the basis of the electrical signal input from the image sensor 46.

After the imaging processing (s203) has been executed, the wearable camera 14 executes transmission processing for transmitting the image generated in the imaging processing to the portable information terminal 12 (s204). The MCU 44 of the imaging unit 36 controls the Bluetooth module 42 so as to perform the transmission. After the transmission of the image to the portable information terminal 12, the wearable camera 14 executes polling processing, and when the push switch 64 is pressed continuously, processing steps from the marker display processing (s202) to the transmission processing (s204) are executed repeatedly.

Every time the transmission processing (s203) is executed, the portable information terminal 12 executes reception processing for receiving the image transmitted from the wearable camera 14 (s102). In the reception processing (s102), the CPU 18 of the portable information terminal 12 controls the Bluetooth module 24 so as to receive the image. In the portable information terminal 12, processing steps from the polling processing (s201) to the transmission processing (s204) are executed repeatedly.

After the reception processing (s102) has been executed, the portable information terminal 12 executes decoding processing for decoding the barcode 2 included in the received image (s103). An algorithm used for the decoding processing can be a decoding algorithm specified in JIS X 0507, for example. As a result of the decoding processing, when the barcode 2 is included in the image, the portable information terminal 12 acquires information in the barcode 2. The acquired information in the barcode 2 is used in an application for managing the article 1.

Then, when the reading is continued (s103: Yes), the reception processing (s102) and the decoding processing (s103) are executed repeatedly.

In the reading system 10 of the present embodiment, the portable information terminal 12 and the wearable camera 14 work together to function as a barcode reader for recognizing the information in the barcode 2. As described above, since the decoding processing (image analysis) based on the image is performed on the portable information terminal 12 side, a processor for performing the image analysis can be omitted on the wearable camera 14 side. Accordingly, the cost required for the wearable camera 14 and the reading system 10 as a whole can be reduced. In addition, further downsizing of the wearable camera 14 is possible. Furthermore, the portable information terminal 12 not only can recognize the information in the barcode from the acquired image but also can use the image for other purposes.

Moreover, since the marker 52 is displayed in the image capture region A of the imaging module 40 (image sensor 46) as shown in FIG. 1, the user can easily adjust the aim of the wearable camera 14 using the marker 52 as a guide.

In the wearable camera 14 configured to capture an image of the article 1, the imaging module 40 and the push switch 64 are disposed in units that are separate from each other. With this configuration, camera shake caused by a user's button operation can be reduced. Furthermore, in the release unit 62, the push switch 64 is disposed on a lateral side of the middle finger 6, and this allows the user to perform a natural button operation using the thumb 5.

Although the reading system according to the present invention has been described above with reference to the illustrative embodiment, the configuration of the present invention is of course not limited to those described above. For example, the present invention can be embodied in various forms such as the following.

Modified Examples

The push switch 64 of the release unit 62 can be a pressure sensor with a resistance value that changes in response to a pressure applied by the thumb 5. In this embodiment, a detection circuit for detecting a change in the resistance value can be disposed in the release unit 62 or the imaging unit 36. The detection circuit includes, for example, a voltage-dividing circuit in which the pressure sensor is used and a converter configured to perform analog-digital conversion of the divided voltage, and the output of the converter is connected to the MCU 44 of the imaging unit 36. The MCU 44 of the imaging unit 36 checks the output of the detection circuit (the output of the converter) in the polling processing (s201), and executes the marker display processing (s202) when a signal indicating that the resistance value has changed (a state where the pressure is being applied) is input thereto.

A light source for displaying the marker 52 is not limited to the semiconductor laser 56, and a light source such as an LED can be used. In the embodiment where the LED is used as the light source, it is preferable to provide an optical system such as a slit or lens through which light output from the LED passes to be converted into a laser form.

The shape of the marker 52 can be any of a point-like shape, a cross-like shape, or a frame-like shape.

(4) The fasteners for attaching the imaging unit 36 and the release unit 62 to the fingers are not limited to the pair of belts 58A and 58B including the hook-and-loop fasteners 60A and 60B and the pair of belts 68A and 68B including the hook-and-loop fasteners 70A and 70B, and can be plastic or metal ring bodies attached to these units 36 and 62.

Also, a glove can be used instead of the fasteners. In this embodiment, the imaging unit 36 is attached to a forefinger slot of the glove, and the release unit 62 is attached to a middle finger slot of the glove.

Although the above embodiment has described an example where the barcode 2 is a one-dimensional barcode, a symbol to be read by the reading system 10 of the present invention can be a two-dimensional barcode, a Color Bit (registered trademark) code represented using three colors of red, blue, and green, a digital mark in which information is embedded by embedded printing using digital watermarking techniques, or a letter(s) on the article 1. Furthermore, by adapting the decoding processing (s103) in the portable information terminal 12 so as to include processing for selecting a symbol to be recognized, switching of a symbol to be read among various symbols also is possible. As described above, by using the program provided on the portable information terminal 12 side, the reading system 10 can attain switching of the symbol to be read, compatibility with symbols obtained using new encoding technology, and batch reading of information from a plurality of symbols included in the acquired image, and thus can be a highly scalable system.

The portable information terminal 12 can not only read information in the symbol from the image acquired by the wearable camera 12 but also store the image in the memory 16. At the time of storing the image in the memory 16, the image and the information in the symbol included in the image can be associated with each other. In addition, in the embodiment where the portable information terminal 12 includes a position acquisition section typified by a GPS, the CPU 18 can acquire position information from the position acquisition section and can store the acquired position information in the memory in association with the information read from a symbol and the acquired image.

Although the Bluetooth modules 24 and 42 are used to performing wireless communication between the portable information terminal 12 and the wearable camera 14 in the above-described embodiment, the wireless communication can be performed using a Wi-Fi module. Alternatively, optical communication using an IrDA module can be used.

Although the above-described embodiment describes an example where the wearable camera 14 is configured so as to be worn on a finger of a user, the wearable camera 14 of the present invention is not limited to the one to be worn on the user's finger. That is, the wearable camera 14 need only be used as a peripheral device for the portable information terminal 12. For example, the wearable camera 14 can be configured so as to be attachable/detachable to/from the portable information terminal 12.

The release unit is not limited to a single unit, and can be formed by a first release unit to be attached to a thumb and a second release unit to be attached to a middle finger. In this embodiment, the first release unit and the second release unit each have an exposed electrode, and these electrodes are arranged so as to face each other. A trigger signal is generated when these electrodes are brought into contact with each other. That is, the electrode of the first release unit (first electrode) is connected to an output terminal of the MCU 44, and the electrode of the second release unit (second electrode) is connected to an input terminal of the MCU 44. In the polling processing (s201), the MCU 44 outputs a signal from the output terminal, and checks whether the signal has been input to the input terminal. At this time, if the first electrode and the second electrode are in contact with each other, the signal is input to the input terminal via these electrodes, and the MCU 44 executes the marker display processing (s202), the imaging processing (s203), and the transmission processing (s204). On the other hand, if the first electrode and the second electrode are not in contact with each other, the signal is cut off and thus is not input to the input terminal of the MCU 44, and the MCU 44 executes the marker hiding processing (S205). As described above, the first release unit is worn on a thumb and the second release unit is worn on a middle finger, and a series of processing steps from the marker display processing (s202) are executed after the electrodes are brought into contact with each other. Accordingly, it is possible to prevent an erroneous operation such that, for example, the release unit is unintentionally operated owing to an impact caused when a user carries a package, resulting in accidental output of a trigger signal. The finger on which the second release unit is to be worn is not limited to a middle finger, and can be a finder, such as a ring finger, different from the finger on which the first release unit is to be worn.

Various improvements, changes, and modifications based on the knowledge of those skilled in the art can be made to the present invention without departing from the spirit and scope of the present invention. Also, the present invention can be embodied with one or more matters specifying the present invention are substituted with other techniques as long as the same action or effect is obtained.

For example, the present invention can be embodied as a camera that includes a macro lens that allows formation of an image of a nearby subject on the light-receiving surface of the image sensor. A reading system including such a camera can read an extremely small symbol such as direct marking on a subject. In addition, since the analysis can be performed while correcting an image acquired by the CPU of the portable information terminal, it is also possible to improve the reading rate of extremely small symbols.

The invention claimed is:

1. A camera that functions as a peripheral device of a portable information terminal configured to recognize information in a symbol on the basis of an acquired image, the camera comprising:
   an image sensor configured to generate the image, and configured to transmit the generated image to the portable information terminal;
   an imager having the image sensor disposed therein; and
   a release separate from the imager and configured to input to the imager a trigger signal for generating the image, the imager and the release being configured to be worn on different fingers.

2. The camera according to claim 1, further comprising a light source configured to display a marker in a region to be imaged by the image sensor.

3. The camera according to claim 1, wherein
   the release has a switch configured to generate the trigger signal, and
   the switch is disposed at a position so as to be operable with a thumb.

4. The camera according to claim 1, wherein the release includes
   a first release having a first electrode and to be worn on a thumb; and
   a second release having a second electrode and to be worn on a part of a hand different from the thumb, and
   the trigger signal is generated when the first electrode and the second electrode are brought into contact with each other.

5. The camera according to claim 1, further comprising a wireless communicator configured to transmit the image to the portable information terminal.

6. A reading system comprising:
   a portable information terminal configured to recognize information in a symbol on the basis of an acquired image; and
   a camera that functions as a peripheral device of the portable information terminal, has an image sensor configured to generate the image, and is configured to transmit the generated image to the portable information terminal;
   an imager having the image sensor disposed therein; and
   a release separate from the imager and configured to input to the imager a trigger signal for generating the image, the imager and the release being configured to be worn on different fingers.

* * * * *